United States Patent
Xu

(10) Patent No.: US 7,782,762 B2
(45) Date of Patent: Aug. 24, 2010

(54) RSVP-TE ENHANCEMENT FOR MPLS-FRR BANDWIDTH OPTIMIZATION

(75) Inventor: Zhuo Xu, Ottawa (CA)

(73) Assignee: Alcatel Lucent, Paris (FR)

( * ) Notice: Subject to any disclaimer, the term of this patent is extended or adjusted under 35 U.S.C. 154(b) by 339 days.

(21) Appl. No.: 11/886,979

(22) Filed: Sep. 21, 2007

(65) Prior Publication Data

US 2009/0080326 A1 Mar. 26, 2009

(51) Int. Cl.
*H04L 12/56* (2006.01)
*G06F 15/173* (2006.01)

(52) U.S. Cl. .................... 370/218; 370/222; 370/237; 709/239

(58) Field of Classification Search .......... 370/216–228, 370/237; 709/235, 238–243, 251
See application file for complete search history.

(56) References Cited

U.S. PATENT DOCUMENTS

| | | | |
|---|---|---|---|
| 6,711,125 B1 | 3/2004 | Walrand et al. | |
| 7,508,755 B2 * | 3/2009 | Liu | 370/228 |
| 7,586,841 B2 * | 9/2009 | Vasseur | 370/218 |
| 7,602,702 B1 * | 10/2009 | Aggarwal | 370/217 |
| 2002/0112072 A1 * | 8/2002 | Jain | 709/239 |
| 2003/0110287 A1 | 6/2003 | Mattson | |
| 2005/0188100 A1 * | 8/2005 | Le Roux et al. | 709/238 |
| 2008/0019266 A1 * | 1/2008 | Liu et al. | 370/228 |

* cited by examiner

*Primary Examiner*—Tri H Phan
(74) *Attorney, Agent, or Firm*—GaLasso & Associates, L.P.

(57) ABSTRACT

RSVP-TE Enhancement for MPLS-FRR Bandwidth Optimization is a method of RSVP-TE protocol enhancement for optimizing network resources when FRR is protecting LSP traffic in a topology where the bypass LSP tunnel traverses the original previous hop(s) of the protected LSP. The node providing FRR protection, the PLR, will use the enhanced message TLVs to report to the nodes all the way back to the HE node. The node(s) on the original path prior to the PLR node can check if there is a better alternative bypass tunnel to use to provide FRR from a network resource optimization perspective (such as using the bypass tunnel from the HE node in a ring topology to reduce the traffic in the ring).

12 Claims, 1 Drawing Sheet

RSVP-TE ENHANCEMENT FOR MPLS-FRR BANDWIDTH OPTIMIZATION

CROSS REFERENCE TO RELATED APPLICATIONS

This United States Non-Provisional patent application does not claim priority to any United States Provisional patent application or any foreign patent application.

FIELD OF THE DISCLOSURE

The disclosures made herein relate generally to the Multi Protocol Label Switching (MPLS) industry. The invention discussed herein is in the general classification of enhanced Resource Reservation Protocol-Traffic Engineering (RSVP-TE).

BACKGROUND

A computer network is a collection of interconnected sub-networks that transmit data between network nodes. A network node is any device capable of sending or receiving data in the network.

Internet Protocol (IP) specifies the exact format of all data as it travels through the network, performs routing functions and selects the transmission path on which data will be sent. Typical routing takes the shortest path in a network even when those paths are congested. Routers utilize ports and addresses in routing tables to send data packets or cells through the network from node to node.

Multiprotocol Label Switching (MPLS) is a general-purpose tunneling mechanism that uses label switching to forward data packets or cells. MPLS, unlike IP, allows packets sent between two nodes to take different paths based on different MPLS labels. MPLS makes use of label-switched paths (LSPs) to steer traffic over certain routes. Service providers can specify explicit routes by using Resource Reservation Protocol-Traffic Engineering (RSVP-TE).

As MPLS becomes more economical in the access ring network to support such services as Triple Play and Mobility, a bandwidth efficient means of handling traffic reroute in case of network failures will become more important. The current RSVP-TE implementation of Fast Reroute (FRR) on a protected LSP is very bandwidth inefficient in such a ring topology.

In a MPLS network, when local failure triggers a node to FRR protect LSP, the node Point of Local Repair (PLR) will send traffic received from the headend (HE) node into the bypass tunnel to reach the tailend (TE) node of the protected LSP. In a ring topology, this bypass tunnel will traverse all the way back to the HE node of the LSP and then reach the TE node from the opposite direction of the original protected LSP path. This causes traffic to flow to the PLR node and then to return in the bypass tunnel, which generates unnecessary congestion in the ring and reduces the bandwidth efficiency of the ring.

Because FRR is currently designed to reduce the convergence time to the network failure assuming that the most efficient way of protecting traffic is to repair the path as close as possible to the failure point and merge the path back to the original path as early as possible, the current implementation of FRR causes the traffic to travel from HE node to the PLR node in the original LSP and then to travel back in the opposite direction in the bypass tunnel. This solution is reasonable in most cases, but not bandwidth efficient in the case of ring topology.

Hence, there is a need in the art for a convenient to install, reliable, inexpensive and bandwidth efficient method for rerouting traffic in a network when a link failure occurs.

SUMMARY OF THE DISCLOSURE

RSVP-TE Enhancement for MPLS-FRR Bandwidth Optimization is a method of RSVP-TE protocol enhancement for optimizing network resources when FRR is protecting LSP traffic in a topology where the bypass LSP tunnel traverses the original previous hop(s) of the protected LSP. The basic idea is to enhance the RSVP-TE protocol such that the node providing FRR protection, the PLR, in such a topology where it will send traffic back towards the original path in the bypass tunnel, will use the enhanced message TLVs to report to the nodes all the way back to the HE node. The node(s) on the original path prior to the PLR node can check if there is a better alternative bypass tunnel to use to provide FRR from a network resource optimization perspective (such as using the bypass tunnel from the HE node in a ring topology to reduce the traffic in the ring).

The present invention solves bandwidth inefficiency through the use of enhanced message Type Length Values (TLVs). The invention will give access and distribution switches, routers and Multiple Tenant Units (MTUs) like the Alcatel 7450 ESS, 7750 SR and 7250 SAS an advantage over competing systems. The invention also supports partial ring topology scenarios where the HE node is not part of the ring.

The method of the present invention is also designed to operate with network elements that do not have this functionality. The older systems without this protocol enhancement will not understand the newly added TLV messages. Because the protocol extension is proposed to be optional and transitive, the impact should be minor. The nodes that do not understand the messages will simply pass them through, and there is no behavior change required from them.

This solution is suitable for any network topology where the bypass tunnel may travel backwards to the HE node of the LSP. One of the most common network topologies is the ring topology, where this new solution will benefit the most. A ring is widely used for a last-mile solution on the telecommunication networks. Because all users in the ring will share the bandwidth, this solution will improve the bandwidth efficiency and the performance of the entire network significantly.

The preferred embodiment of the invention utilizes a method for rerouting traffic on a network that shortens the path between a HE node and a TE node when a link failure occurs through the use of enhanced message TLVs.

The principal object of this invention is to provide a method for rerouting traffic on a network that permits the HE node to signal the PLR node that it is using its bypass tunnel causing the PLR node to stop refreshing its protected LSP which can cause unexpected behavior.

Another object of this invention is for the PLR node to check the bypass tunnel path, and when it identifies that traffic is detoured back to the HE node, it notifies the HE node that it should use a more efficient bypass tunnel and upon receiving such a notification, the HE node will detour traffic locally and signal the PLR to not refresh the protected path anymore.

Another object of this invention is to provide a method that allows rerouted traffic through a bypass tunnel at a PLR to reach its destination.

Another object of this invention is to provide a method that promotes bandwidth efficiency by allowing subsequent data traveling between the HE node and the TE node to take an alternate path rather than traveling the unnecessary path to the PLR then back to the HE node before traveling onto the TE node via the alternate path.

Another object of this invention is to provide a method for transmitting traffic on a network from a HE node to a TE node during a link failure that is relatively inexpensive to install and maintain.

Another object of this invention is to provide a reliable method for transmitting traffic on a network from a HE node to a TE node during a link failure in the network.

Yet another object of this invention is to provide a method that is transparent such that nodes that do not support this new technology pass the new TLV messages through without any behavior change.

DETAILED DESCRIPTION OF THE DRAWINGS

Figure 1:
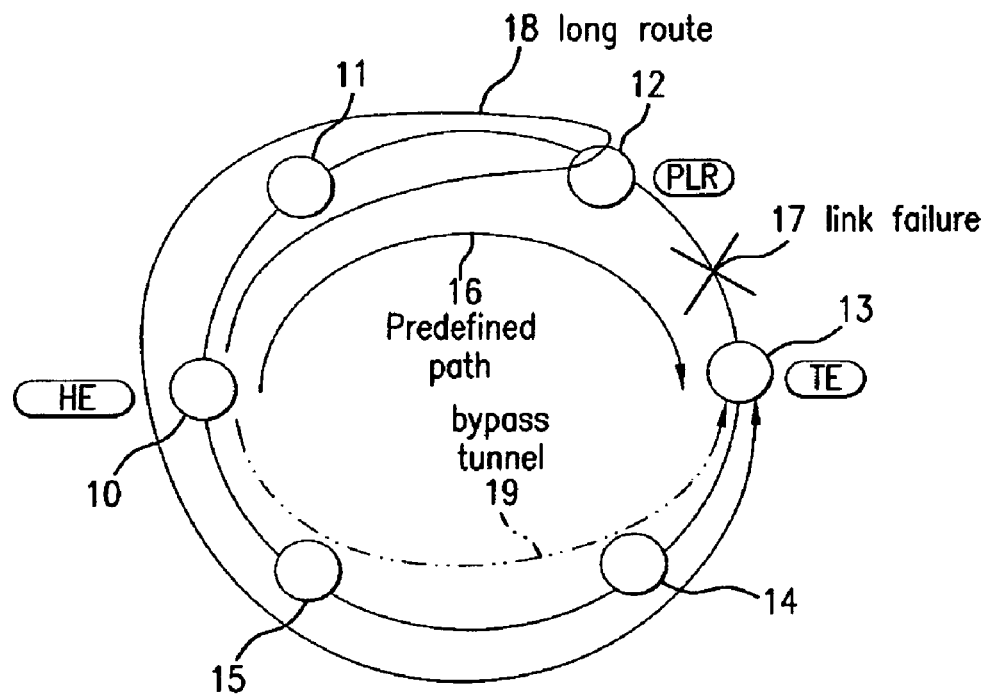
FIG. 1 depicts the traditional behavior of FRR in a ring.

FIG. 1 depicts a diagram showing the traditional behavior of FRR in a ring. A first node 10 serves as the HE node. Proceeding clockwise, a second node 11, a third node 12, a fourth node 13 (also called the TE node in this example), a fifth node 14 and a sixth node 15 are arranged in a ring shape.

Data packets that are being sent from the first node 10 to the fourth node 13 typically follow the predefined path 16, proceeding from first node 10 to second node 11 to third node 12 and finally to the ultimate destination—the fourth node 13. However, in this example, a link failure 17 (denoted by the bold X) occurs during the transmission of the data packets from third node 12 to fourth node 13. As a result, the third node 12 becomes the point of local repair (PLR node) since it is the last node to successfully receive the data packet traveling toward the fourth node 13.

The third node 12 then implements FRR protection via its bypass tunnel. The data packet will travel counterclockwise in this example into the bypass tunnel and go through the second node 11 and back to the first node 10 before traveling into the sixth node 15 and the fifth node 14 and finally to its original destination at the fourth node 13.

Although the first node 10 has a shorter bypass tunnel 19 from the first node 10 to the sixth node 15 to the fifth node 14 to the fourth node 13, subsequent traffic will not use this bypass tunnel 19 directly because the network failure is not in the local link of the first node 10. Instead, traffic will continue to travel the long route 18 described herein.

Figure 2:
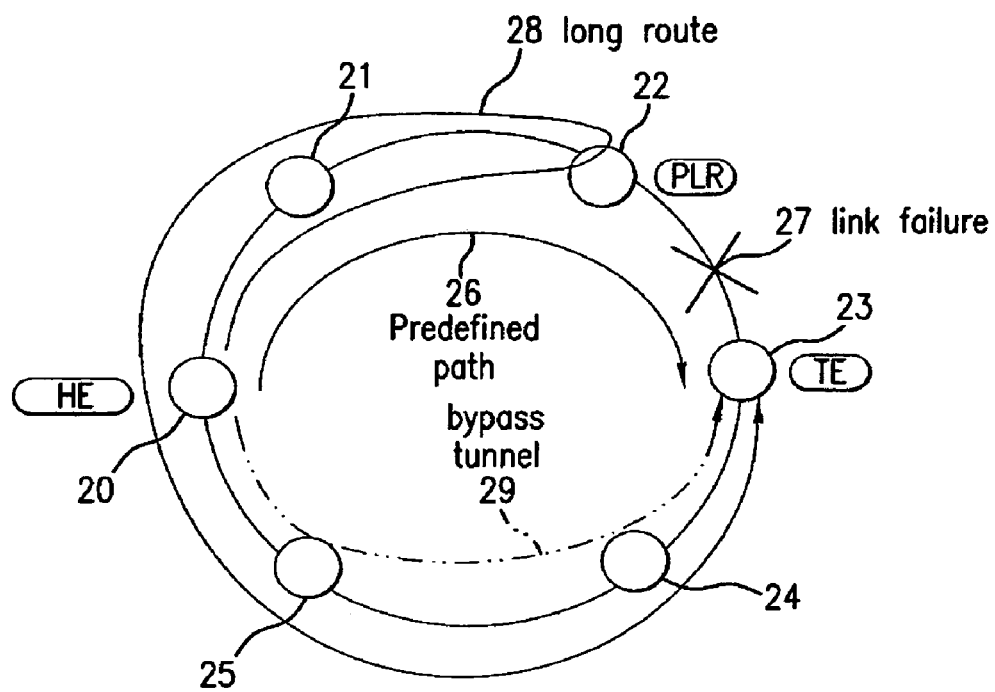
FIG. 2 depicts the enhanced behavior of FRR in a ring, utilizing the preferred method of the invention.

FIG. 2 depicts a diagram showing the enhanced behavior of FRR in a ring utilizing the preferred method of the invention. A first node 20 serves as the HE node. Proceeding clockwise, a second node 21, a third node 22, a fourth node 23 (also called the TE node in this example), a fifth node 24 and a sixth node 25 are arranged in a ring shape.

Data packets that are being sent from the first node 20 to the fourth node 23 typically follow the predefined path 26, proceeding from first node 20 to second node 21 to third node 22 and finally to the ultimate destination—the fourth node 23. However, in this example, a link failure 27 (denoted by the bold X) occurs during the transmission of the data packets from third node 22 to fourth node 23. As a result, the third node 22, becomes the point of local repair (PLR node) since it is the last node to successfully receive the data packet traveling to the fourth node 23.

The third node 22 then implements FRR protection via the bypass tunnel. The data packet will travel counterclockwise in this example into the bypass tunnel and go through the second node 21 and back to the first node 20 before traveling into the sixth node 25 and the fifth node 24 and finally to its original destination at the fourth node 23.

The major difference in the method and diagram of FIG. 2 from the method and diagram of FIG. 1 is in the additional TLV messages sent from the nodes that permit subsequent data packets from having to take the same path as the original data packets, promoting bandwidth efficiency. The TLV messages prevent subsequent data packets being sent from the first node 20 to the fourth node 23 to implement the shorter bypass tunnel 29 directly through the sixth node 25 and the fifth node 24 rather than having to travel the long route 28 to the third node 22 through the second node 21 and then traversing back the same path it came before finally traveling to the sixth node 25, the fifth node 24 and then to the fourth node 23.

The most significant advantage of this solution is the saved bandwidth. In the traditional FRR scenario, during the link failure, the traffic from LSP from the first node 10 to the fourth node 13 will be doubled between the first node 10 and the second node 11 and between the second node 11 and the third node 12, because traffic travels to the third node 12 and then returns back.

With this new solution, during the link protection, no bandwidth will be consumed by the protected LSP from the first node 20 to the fourth node 23, because the first node 20 will use its local bypass tunnel 29 from the first node 20 to the sixth node 25 to the fifth node 24 and to the fourth node 23 to carry the traffic. Any traffic in the first node 20, the second node 21 and the third node 22 is not impacted by the link failure at all.

The proposed enhanced RSVP-TE protocol will have several new TLVs in a PathErr (notification of local repair) message, a RESV (stop sending refresh) message and a ResvErr (dismissing detour) message. When the HE node of the protected LSP receives the PathErr TLV, it switches to use its local bypass tunnel to send traffic to the opposite direction of the ring. The HE node will from now on use its bypass tunnel to send the traffic of the protected LSP to the TE node. The HE node will also notify the original PLR by sending another new TLV in the ResvErr message indicating that a better bypass was found and the detour is dismissed, and the original PLR will stop refreshing the LSP through the tunnel and stop sending the PathErr message to the HE node.

Without the interaction between the HE and PLR node, the PLR node will keep refreshing the protected LSP, even when the HE node switches to the new bypass tunnel. This behavior will cause the HE node to behave unexpectedly and may lead to service outage. The proposed explicit signaling solution will solve this problem, because both HE and PLR nodes are aware of the new behavior. For nodes that do not support this feature, the messages are transparently passed through without behavior change at all.

In certain embodiments, a mechanism could be utilized to allow subsequent data to return to the original path from the HE node to the TE node. For example, a timer could start when the HE node receives the error message from the PLR node. Subsequent data from the HE node to the TE node would use the local bypass tunnel until the timer expires at which point routing from the HE node to the TE node reverts to the original protocol. If the link failure has been corrected between the PLR and the TE, then the traffic will proceed to the TE node via the original route. If, however, the link failure has not been corrected after the timer expires, the data will again be rerouted and the timer would begin again.

It is contemplated that the method described herein can be implemented as software, including a computer-readable medium having program instructions executing on a computer, hardware, firmware, or a combination thereof. The method described herein also may be implemented in various combinations on hardware and/or software.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A method for performing reroute operations for data packets when a link failure occurs within a network comprising the steps of:
    (a) routing a data packet between a headend node and a tailend node;
    (b) detecting a link failure between the headend node and the tailend node prior to the data packet reaching the tailend node;
    (c) receiving the data packet at a point of local repair (PLR) node between the headend node and the tailend node;
    (d) rerouting the data packet through a bypass tunnel at the PLR node back to the headend node and onto the tailend node; and
    (e) transmitting an error message only from the PLR node to the headend node allowing to use a local bypass tunnel at the headend node to carry a future data packet to the tailend node.

2. The method of claim 1 further comprising
    sending a message from the headend node to the PLR node to stop the use of the bypass tunnel.

3. The method of claim 2 wherein sending a message from the headend node to the PLR node to stop the use of the bypass tunnel further includes a stop refreshing the error message command.

4. The method of claim 1 wherein all of the steps are transparent.

5. The method of claim 1 further comprising
    starting a timer when the headend node receives the error message from the PLR node and using the local bypass tunnel until the timer expires at which point routing from the headend node to the tailend node reverts to an original protocol.

6. The method of claim 1 wherein the steps are implemented with a Multiple Tenant Unit.

7. The method of claim 1 wherein the steps are implemented with a router.

8. A transparent method for performing reroute operations for data packets when a link failure occurs within a network comprising the steps of:
    (a) routing a data packet between a headend node and a tailend node;
    (b) detecting a link failure between the headend node and the tailend node prior to the data packet reaching the tailend node;
    (c) receiving the data packet at a point of local repair (PLR) node between the headend node and the tailend node;
    (d) rerouting the data packet through a bypass tunnel at the PLR node back to the headend node and onto the tailend node;
    (e) transmitting an error message only from the PLR node to the headend node allowing to use a local bypass tunnel at the headend node to carry a future data packet to the tailend node; and
    (f) sending a message from the headend node to the PLR node to stop the use of the bypass tunnel.

9. The method of claim 8 further comprising
    starting a timer when the headend node receives the error message from the PLR node and using the local bypass tunnel until the timer expires at which point routing from the headend node to the tailend node reverts to an original protocol.

10. The method of claim 8 wherein sending a message from the headend node to the PLR node to stop the use of the bypass tunnel further includes a stop refreshing the error message command.

11. The method of claim 8 wherein the steps are implemented with a Multiple Tenant Unit.

12. The method of claim 8 wherein the steps are implemented by a router.

* * * * *